United States Patent [19]

Suzuki

[11] Patent Number: 4,645,372

[45] Date of Patent: Feb. 24, 1987

[54] POWER TRANSMITTING COUPLING

[75] Inventor: Tsunehiko Suzuki, Tokyo, Japan

[73] Assignee: Matsui-Walterschield Ltd., Tokyo, Japan

[21] Appl. No.: 779,268

[22] Filed: Sep. 23, 1985

[30] Foreign Application Priority Data

Oct. 1, 1984 [JP] Japan ................................ 59-204145
Jun. 3, 1985 [JP] Japan ................................ 60-118949

[51] Int. Cl.[4] .............................................. F16B 21/00
[52] U.S. Cl. .................................... 403/325; 403/322; 403/328; 403/316
[58] Field of Search ............... 403/328, 322, 326, 327, 403/359, 316, 317, 318, 325, 321

[56] References Cited

U.S. PATENT DOCUMENTS

| | | | |
|---|---|---|---|
| 2,890,070 | 6/1959 | Kaman et al. | 403/365 |
| 2,890,072 | 6/1959 | Kaman et al. | 403/365 |
| 3,302,960 | 2/1967 | Herrmann | 403/325 |
| 3,531,144 | 9/1970 | Bizilia | 403/326 |
| 3,551,013 | 12/1970 | Trojanowski et al. | 403/359 |
| 3,747,966 | 7/1973 | Wilkes et al. | |
| 4,198,080 | 4/1980 | Carpenter | 403/325 X |
| 4,318,630 | 3/1982 | Herchenbach et al. | 403/322 |
| 4,453,449 | 6/1984 | Hollmann | 403/328 X |
| 4,579,476 | 4/1986 | Post | 403/328 X |

Primary Examiner—Cornelius J. Husar
Assistant Examiner—Joseph A. Fischetti
Attorney, Agent, or Firm—Silverman, Cass, Singer & Winburn

[57] ABSTRACT

A power transmitting coupling includes a hub member such as a yoke and a shaft such as a splined shaft fitted therein axially slidably but nonrotatably relative to each other, and detent balls accommodated in the hub member and partially extending into a ball setting groove of the shaft for preventing the shaft from removing from the hub member. According to the invention, the coupling comprises slide means slidable on the hub member into a ball holding position where the detent balls partially extending into the ball setting groove of the shaft are held and a ball non-holding position where the detent balls are not held, spring means for urging the slide means in one direction, holding position holding means for holding the slide means at the ball holding position in cooperation with the spring means, and non-holding position holding means for holding the slide means at the ball non-holding position in cooperation with the spring means but releasing the slide means when the detent balls move outwardly, thereby enabling the shaft and the hub member to be connected and disconnected only by once sliding the slide means without holding the slide means by a hand of an operator during the connecting and disconnecting operation.

9 Claims, 28 Drawing Figures

FIG_1
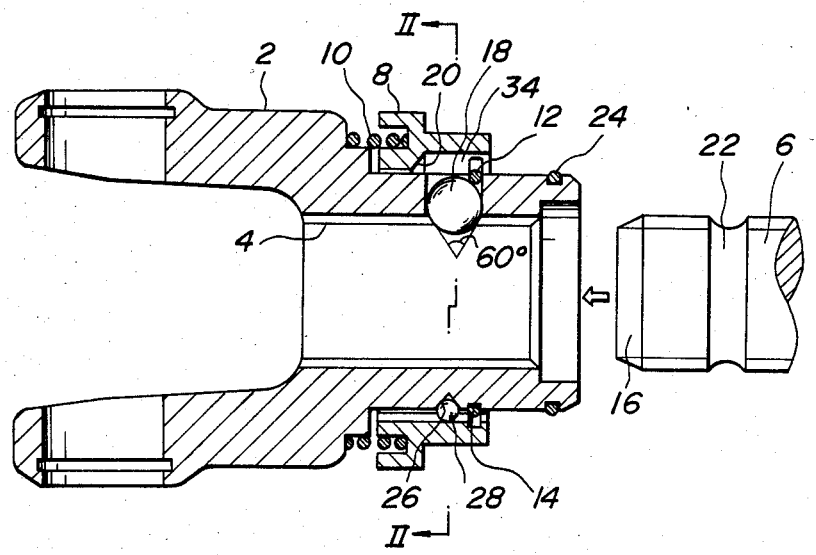
FIG_2
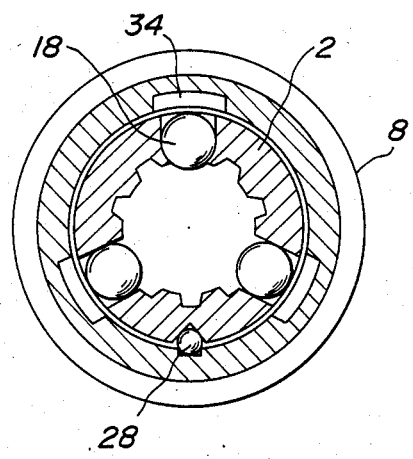

FIG_3
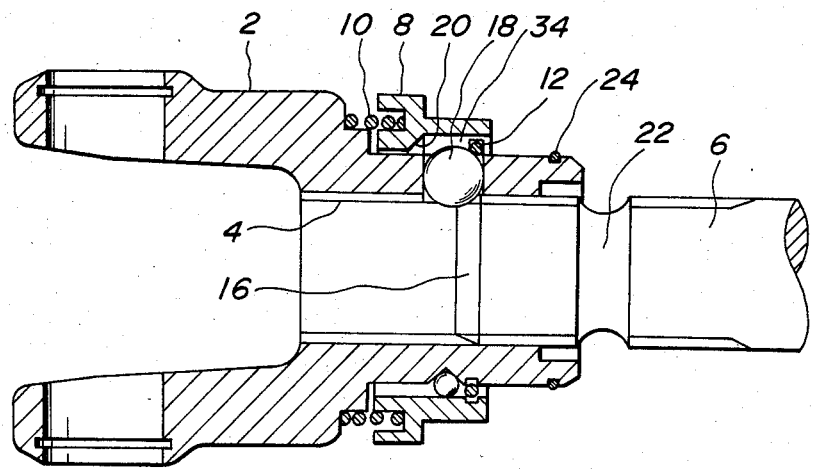
FIG_4
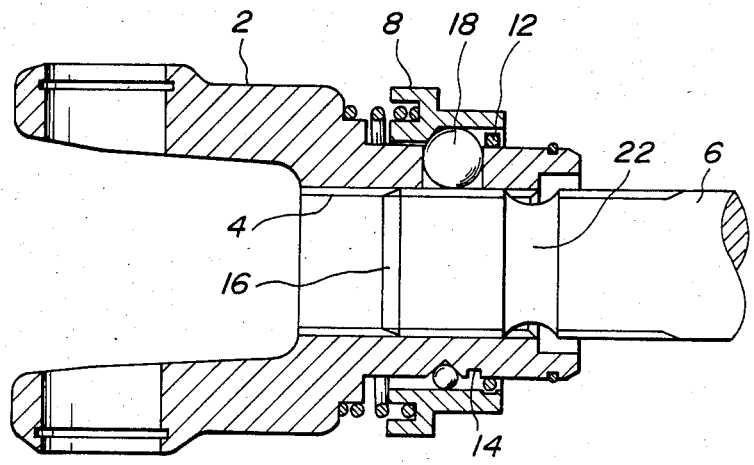

FIG_7a
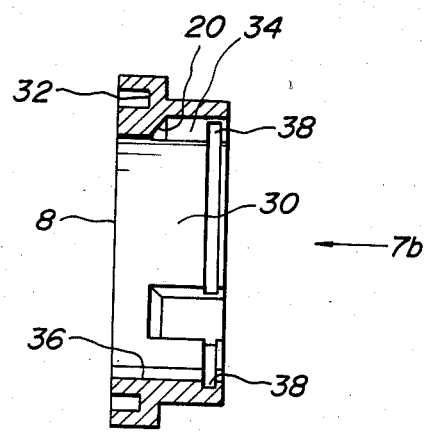
FIG_7b
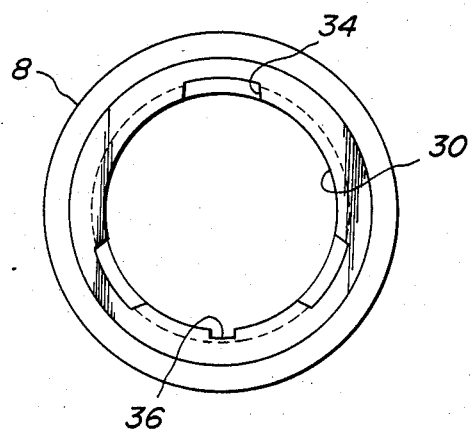

FIG_8
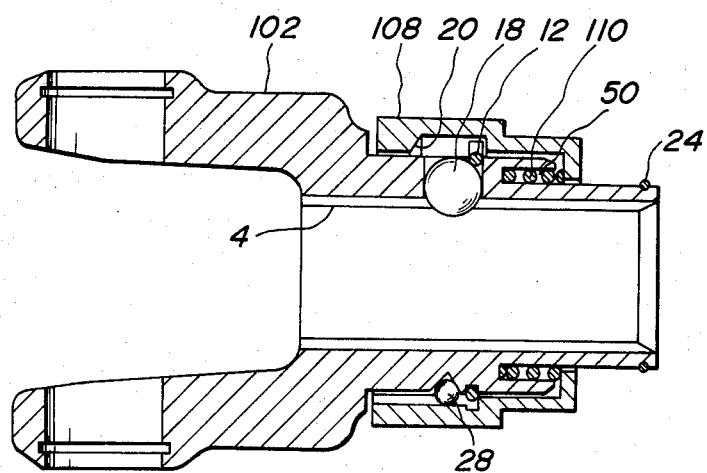
FIG_9
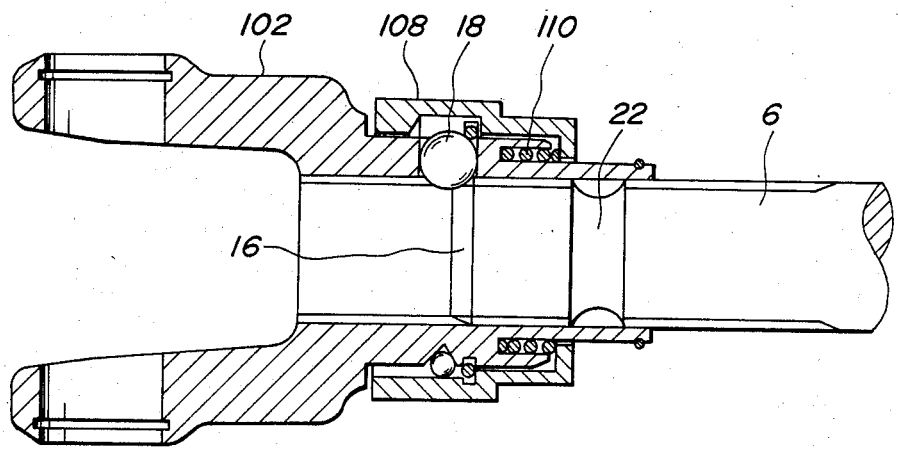

FIG_10
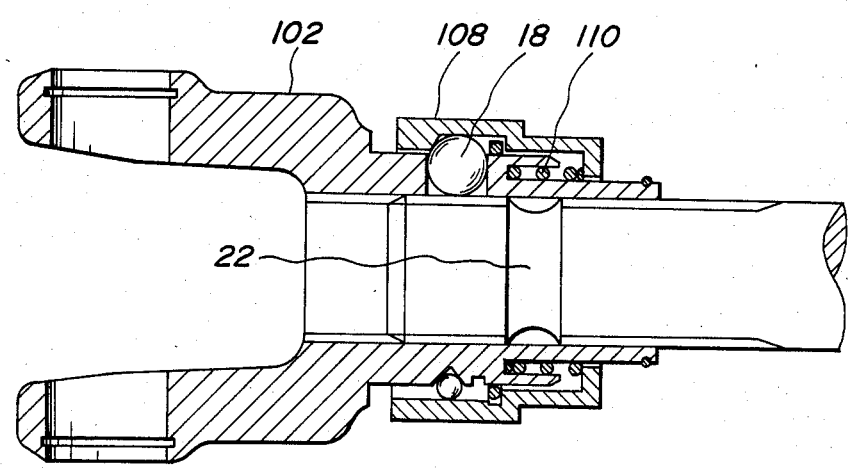
FIG_11
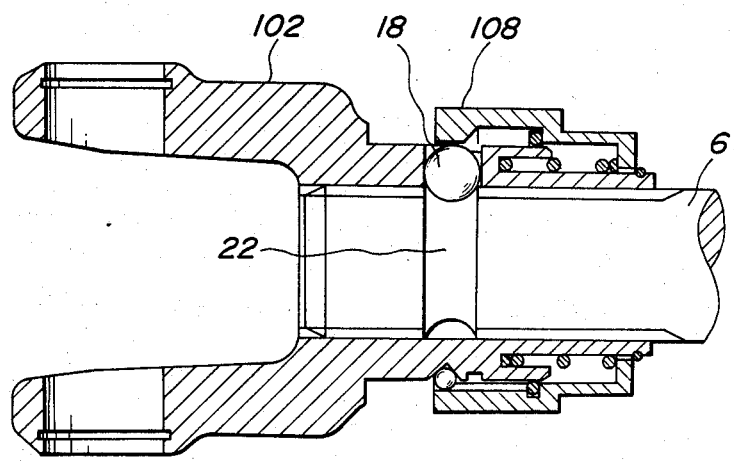

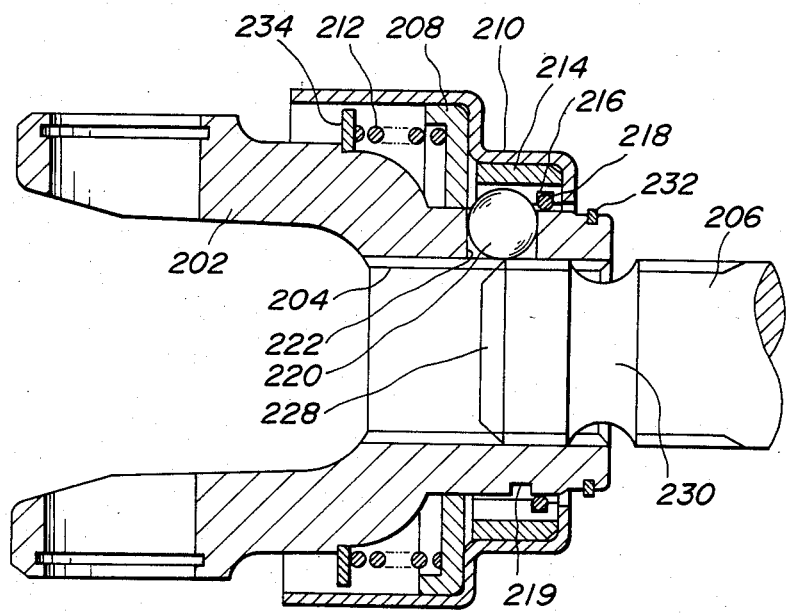
FIG_19
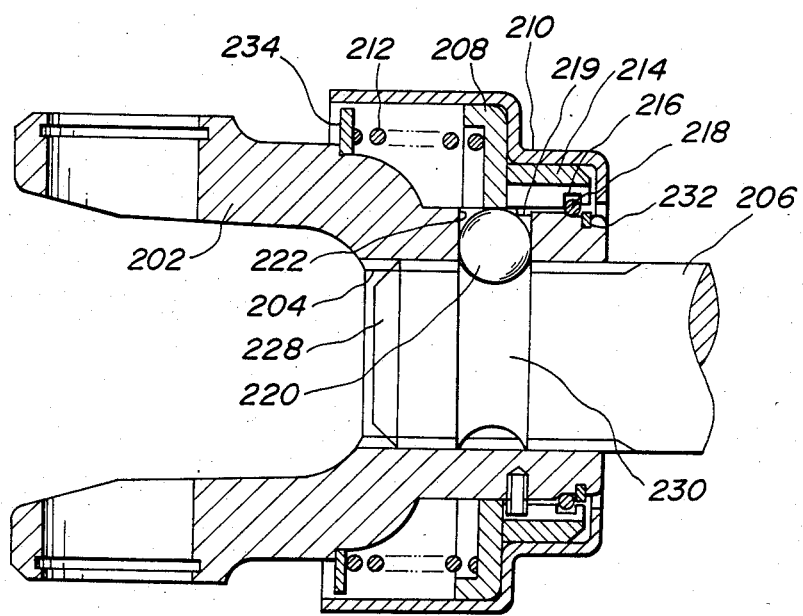
FIG_20

FIG.21
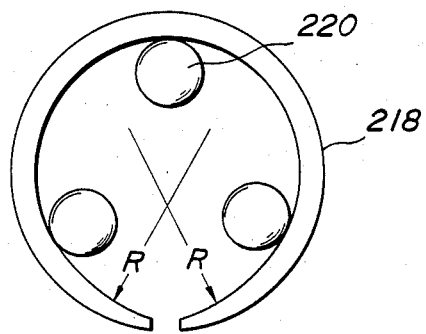
FIG.22a   FIG.22b
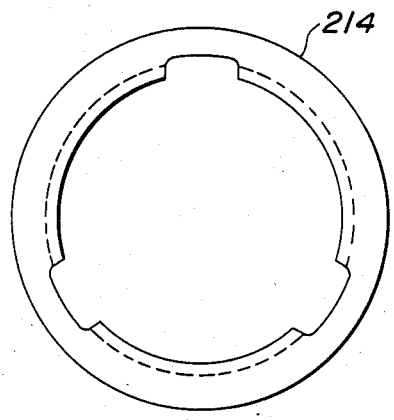 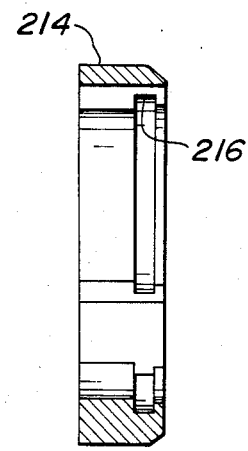

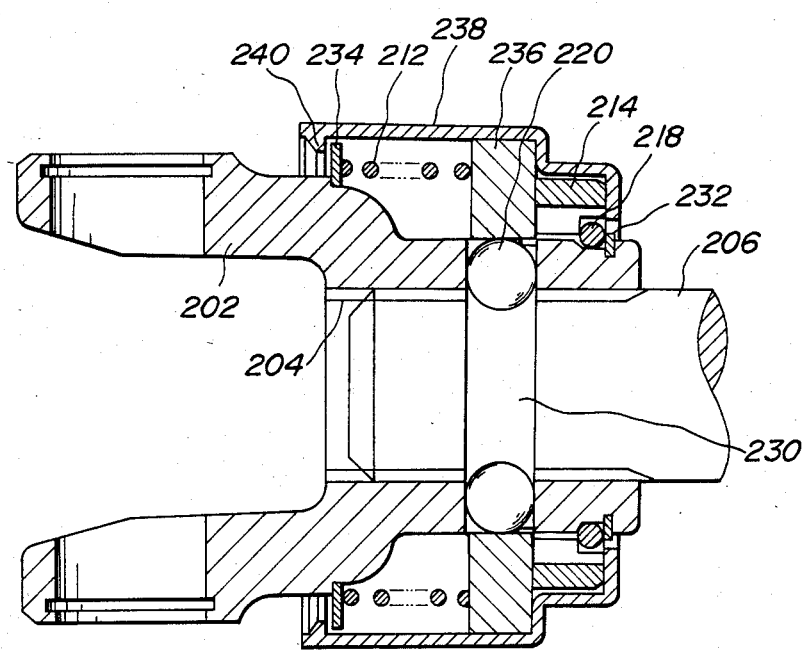
FIG_25

4,645,372

POWER TRANSMITTING COUPLING

BACKGROUND OF THE INVENTION

This invention relates to a power transmitting coupling, and more particularly to a coupling for connecting a shaft of a working machine to an output shaft of, for example, a tractor.

Power transmitting couplings have been used in various kinds of machines. Such couplings are generally arranged in narrow spaces in machines or between machines. Working machines are frequently operated in dusty or muddy places. In order to avoid the couplings from being fouled, they are equipped with covers in many cases. Accordingly, operations of the couplings are generally difficult and are dangerous. In order to solve such problems, various kinds of couplings have been proposed. However, there has been no coupling which completely solves the above problems and can be used in safety in narrow, dusty and muddy spaces even if hidden by a cover.

SUMMARY OF THE INVENTION

It is a principal object of the invention to provide a power transmitting coupling which solves all the above problems and is capable of connecting and disconnecting a shaft and a mating hub member only by once sliding slide means without holding the sliding means by a hand of an operator during connecting and disconnecting operation.

In order to achieve this object, a power transmitting coupling including a hub member and a shaft fitted therein axially and slidably but nonrotatably relative to each other, and at least one detent ball accommodated in said hub member and partially extending into a ball setting groove of said shaft for preventing the shaft from removing from the hub member, according to the invention comprises slide means slidable on said hub member into a ball holding position where said detent ball partially extending into said ball setting groove of the shaft is held and ball a non-holding position where said detent ball is not held, spring means for urging said slide means in one direction, holding position holding means for holding said slide means at said ball holding position in cooperation with said spring means, and non-holding position holding means for holding said slide means at said ball non-holding position in cooperation with said spring means but releasing said slide means when said detent ball moves outwardly.

A stopper ring is preferably provided on the hub member so as to abut against the slide means urged by the spring means to form the holding position holding means, and further the slide means is formed in the form of a collar, and non-holding position holding means comprises a C-shaped spring ring having a spring force contracting radially inwardly accommodated in a spring ring receiving groove formed in an inside of the collar, and a spring ring holding groove formed in a circumference of the hub member.

In a preferred embodiment of the invention, the spring means is a compression coil spring and is arranged in said slide means, and more preferably the coil spring is accommodated in a circular deep recess formed in said hub member on a shaft insertion side so as to be covered by the slide means.

In a further preferred embodiment of the invention, the slide means comprises a setting ring slidable on the hub member to the ball holding position, a setting cover arranged on and slidable together with the setting ring and an outer cover causing the setting ring and the setting cover to slide together relative to a hub member.

In order that the invention may be more clearly understood, preferred embodiments will be described, by way of example, with reference to the accompanying drawings.

BRIEF DESCRIPTION OF THE DRAWINGS

FIG. 1 is a sectional view of the coupling of a first embodiment of the invention;

FIG. 2 is a sectional view taken along a line II—II in FIG. 1;

FIG. 3 is a sectional view of the coupling shown in FIG. 1 illustrating a step starting to insert a shaft into a hub member;

FIG. 4 is a sectional view of the coupling shown in FIG. 1 illustrating a halfway step of inserting the shaft into the hub member;

FIG. 7a is a sectional view of a slide collar used in the coupling shown in FIG. 1;

FIG. 7b is a side view of the slide collar shown in FIG. 7a as viewed in a direction of an arrow 7b in FIG. 7a;

FIG. 8 is a coupling of a second embodiment of the invention;

FIG. 9 is a sectional view of the coupling shown in FIG. 8 illustrating a step starting to insert a shaft into a hub member;

FIG. 10 is a sectional view of the coupling shown in FIG. 8 illustrating a halfway step of inserting the shaft into the hub member;

FIG. 11 is a sectional view of the coupling shown in FIG. 8 which has completed the insertion of the shaft;

FIG. 19 is a sectional view of the coupling shown in FIG. 16 illustrating a halfway step of inserting the shaft into the hub member;

FIG. 20 is a sectional view of the coupling shown in FIG. 16 which has completed the insertion of the shaft;

FIG. 21 is a front elevation of a spring ring used in the coupling shown in FIG. 16;

FIG. 22a is a front elevation of a setting cover used in the coupling shown in FIG. 16;

FIG. 22b is a sectional view of the setting cover shown in FIG. 22a;

FIG. 23b is a sectional view of the outer cover and the setting ring shown in FIG. 23a;

FIG. 25 is a sectional view of a coupling of a sixth embodiment of the invention.

DESCRIPTION OF THE PREFERRED EMBODIMENTS

Figure 5:
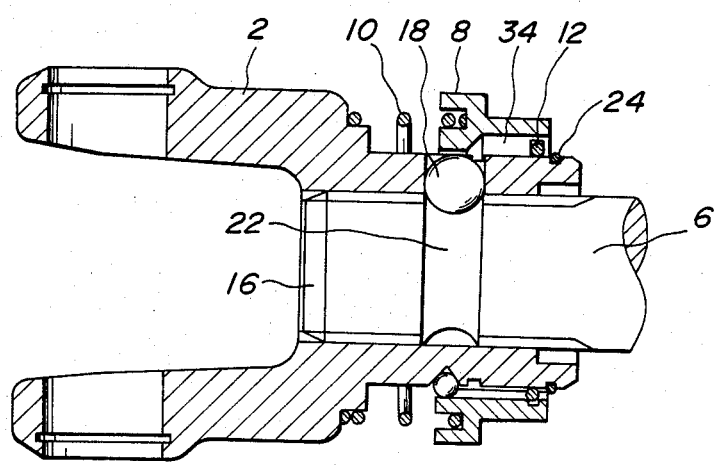
FIG. 5 is a sectional view of the coupling shown in FIG. 1 which has completed the insertion of the shaft.

FIGS. 1-5 illustrate a first preferred embodiment of the coupling according to the invention which is applied to a universal joint. FIGS. 1, 3, 4 and 5 show successive steps for inserting an externally splined shaft 6 as a driving shaft into a internally splined bore or socket 4 of a yoke 2 as a hub member mating with the shaft 6. The sucessive steps of inserting the shaft into the hub member will be explained hereinafter to facilitate understanding the constitution of the coupling of this embodiment.

FIG. 1 illustrates a slide collar 8 which has been pushed against a force of a compression coil spring 10 by an operator to the left as viewed in this drawing in order to insert the splined shaft 6 into the socket 4 of the yoke 2. In this condition, a C-shaped spring ring or split ring 12 housed in the slide collar 8 is positioned in a spring ring holding groove 14 formed in the yoke 2, so that even if the operator releases the slide collar 8, it is maintained in the spring ring holding groove 14 without returning to its original position. The relation between the slide collar 8 and the spring ring 12 will be explained in detail later. Accordingly, the yoke 2 shown in FIG. 1 is ready to receive the splined shaft 6. One end of the coil spring 10 is seated on a circular flat shoulder formed on the yoke 2 and the other end is seated in a circular recess formed in the slide collar 8.

The splined shaft 6 is then inserted into the socket of the yoke 2 as shown in FIG. 3. As the splined shaft is chamfered at its distal end as shown by a numeral 16, detent balls 18 are pushed outwardly by a cam action of the chamfered portion 16 of the splined shaft 6 being inserted into the socket of the yoke 2, thereby enabling the splined shaft to be inserted therein as shown in FIG. 4. When the detent balls 18 are moved outwardly by the action of the chamfered portion 16 of the splined shaft 6, the detent balls 18 moving outwardly expand the spring ring 12 out of the spring ring holding groove 14, so that the slide collar 8 is no longer restrained by the spring ring 12 and is moved by an action of the compression coil spring 10 to the right as viewed in FIG. 4. In the condition shown in FIG. 4, an inner tapered surface 20 of the slide collar 8 abuts against the detent balls 18, so that the slide collar 8 is kept in this position. However, the compression coil spring 10 still urges the slide collar 8 toward the right as viewed in FIG. 4 and the inner tapered surface 20 of the slide collar 8 urges the detent balls inwardly owing to a wedge action of the tapered surface 20. Moreover, the detent balls 18 positioned as shown in FIG. 4 do not obstruct a further insertion of the shaft 6 into the yoke.

When the shaft 6 arrives in a position shown in FIG. 5, the detent balls 18 are forced into a ball setting groove 22 in the splined shaft 6 by the action of the inner tapered surface 20 of the slide collar 8, so that the slide collar 8 is no longer retained by the detent balls 18 and moved toward the right as viewed in FIG. 5 by the action of the compression coil spring 10 until the slide collar 8 abuts against a stopper ring 24 which may be a C-shaped spring ring provided on the hub portion of the yoke 2. The detent balls 18 in this condition are retained by the slide collar 8 to prevent the splined shaft 6 from removing from the yoke 2. The slide collar 8 in this position holds the detent balls 18 received in the ball setting groove 22 of the shaft. Such a position is referred to herein as "ball holding position" of the slide collar 8. As this time, moreover, the slide collar 8 is urged against the stopper ring 24 by the compression coil spring 10 so as to be held in the ball holding position. Accordingly, the stopper ring 24 constitutes "holding position holding means" for the slide collar 8.

Furthermore, the position of the slide collar 8 shown in FIG. 1 is referred to herein "ball non-holding position" where the slide collar 8 does not hold the detent balls 18. In this "ball non-holding position", the slide collar 8 is urged by the compression coil spring 10 but is held by the spring ring 12 engaging in the spring ring holding groove 14. Therefore, the spring ring 12 and the spring ring holding groove 14 constitute "non-holding position holding means" for the slide collar 8.

In order to remove the splined shaft 6 from the yoke 2, the slide collar 8 in the position shown in FIG. 5 is moved to the left as viewed in this drawing against the force of the compression coil spring 10 until the slide collar 8 arrives at the position shown in FIG. 1. In this position, the slide collar 8 is held in its "ball non-holding position" by the spring ring 12 engaging in the spring ring holding groove 14 of the yoke 2. Accordingly, even if the slide collar 8 is released by the operator, it is kept in the position, so that the splined shaft 6 is freely removed from the yoke. When the operator starts to remove the splined shaft 6 from the yoke 2, the detent balls 18 are urged outwardly by an action of a concaved edge of the ball setting groove 22 of the splined shaft 6 to expand the spring ring 12 out of the spring ring holding groove 14, so that the slide collar 8 is moved by the force of the compression coil spring 10 to the right as viewed in the drawings until the slide collar 8 arrives at the position shown in FIG. 4. The splined shaft 6 can be removed from the yoke 2. After the removal of the shaft 6, the slide collar 8 urges the detent balls 18 inwardly and is further moved to the right by the force of the compression coil spring 10 until the slide collar 8 abuts against the stopped ring 24.

In order to prevent the slide collar 8 from rotating about the hub portion of the yoke 2, the hub portion is formed with a recess 26 for accommodating a ball 28 which engages a guide groove 36 formed in an inner surface of the slide collar 8 in the sliding direction thereof (FIG. 7a). In order to prevent the rotation of the slide collar, other means such as key and key way may be used instead of the ball 28 and guide groove 36. The hub portion of the yoke is formed with apertures for receiving the detent balls as shown in the drawings. In order to prevent the detent balls from falling inwardly into the socket 4 of the yoke, for example, inner ends of the apertures for receiving the detent balls are tapered toward an axis of the socket 4 of the yoke 2 as shown by 60° in FIG. 1. The detent balls are preferably steel balls but may be made of a wear-resistant plastic material. The number of the detent balls 18 may be two. However, the three balls 18 as in this embodiment shown in FIG. 2 are preferable in view of stability. A commercially available snap ring or circlip is preferably utilized as the stopper ring 24.

Figure 6:
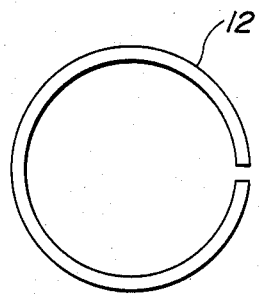
FIG. 6 is a front elevation of a spring ring used in the coupling shown in FIG. 1.

The C-shaped spring ring 12 is an annular member as shown in FIG. 6 having a resilient force which tends to contract inwardly. The spring ring 12 may have any cross-section. In general, however, a circular cross-section is preferable in consideration of the contact with the detent balls 18.

Referring to FIG. 7 illustrating the slide collar 8 in detail, it comprises an inner surface 30 slidable on the hub portion of the yoke, an annular groove 32 for accommodating one end of the compression coil spring 10, a groove 34 for receiving the detent balls 18 and the guide groove 36 for the ball 28 in order to prevent the rotation of the slide collar 8. The slide collar 8 is further formed in its inside with a spring ring receiving annular groove 38 for receiving the spring ring 12.

The slide collar 8 is preferably made of steel. However, it may be made of a wear resistant plastic material.

FIGS. 8–11 illustrate a second embodiment of the invention. This coupling is similar to that shown in FIGS. 1–7 with exception that a compression coil spring 110 instead of the spring 10 of the previous embodiment is arranged in the slide collar 108 so as to be completely concealed therein, so that the coupling is preferably used in dusty and muddy foul places.

With this arrangement, it is required to form a comparatively deep groove or recess 50 in a hub portion of a yoke 102 for receiving the spring 110. The slide collar 108 is somewhat elongated to include a portion for accommodating the compression coil spring 110.

The positions of the coupling shown in FIGS. 8, 9, 10 and 11 correspond to those shown in FIGS. 1, 3, 4 and 5 illustrating the previous embodiment, respectively. The operation and others will not be described in further detail since they are substantially the same as those of the previous embodiment.

Figure 12:
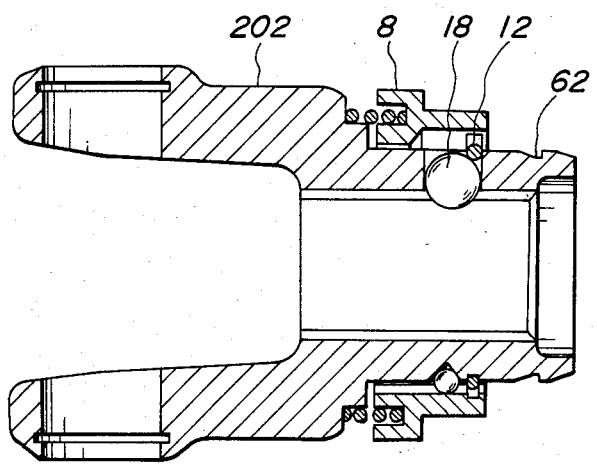
FIG. 12 is a sectional view of a coupling of a third embodiment of the invention.
Figure 13:
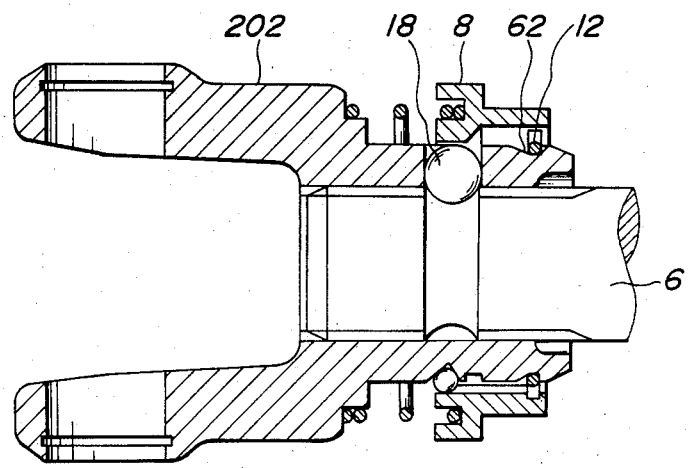
FIG. 13 is a sectional view of the coupling shown in FIG. 12 which has completed the insertion of the shaft.

A third embodiment of the invention is shown in FIGS. 12 and 13. In this embodiment, a hub portion of a yoke 202 is formed with a stopper groove 62 which serves as the stopper ring 24 in the previous embodiments. When the yoke 202 and a shaft 6 are completely connected, a spring ring 12 engages the groove 62 to prevent a slide collar 8 from further moving to the right. Accordingly, the stopper ring 24 can be saved in this embodiment. A sidewall of the stopper groove 62 on a side of detent balls 18 is very slightly inclined toward a bottom of the groove.

As the stopper ring 24 is not needed in this embodiment, the number of the parts becomes less.

Figure 14:
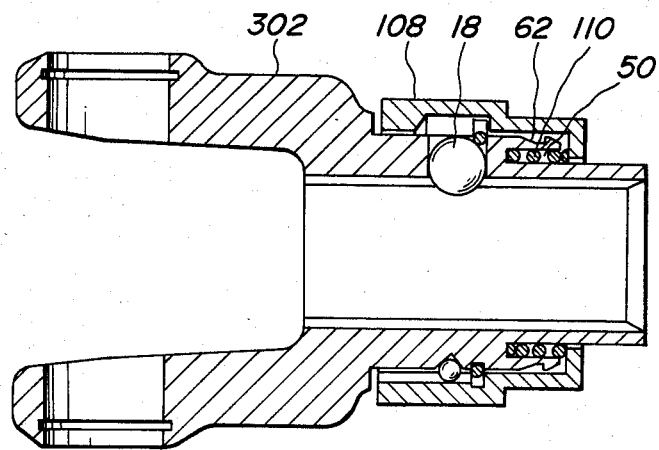
FIG. 14 is a sectional view of a coupling of a fourth embodiment of the invention.
Figure 15:
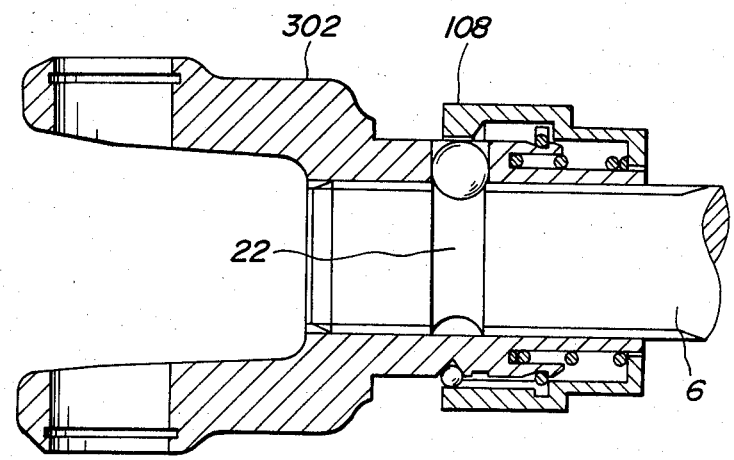
FIG. 15 is a sectional view of the coupling shown in FIG. 14 which has completed the insertion of the shaft.

FIGS. 14 and 15 illustrate a fourth embodiment of the invention, which is a combination of the second and third embodiments. Namely, a slide collar 108 accommodates a spring 110, while a yoke 302 is formed with a circular deep recess or groove 50 for receiving the spring 110 and a stopper groove 62 as a stopper for a spring ring without using the stopper ring 24, so as to have the advantages of the second and third embodiments.

In the above embodiments, the detent balls are held by the slide collar which has moved from the yoke side to the shaft side. This sliding direction of the slide collar may be reversed, that is, the slide collar may be slid from the shaft side to the yoke side to hold the detent balls.

Figure 16:
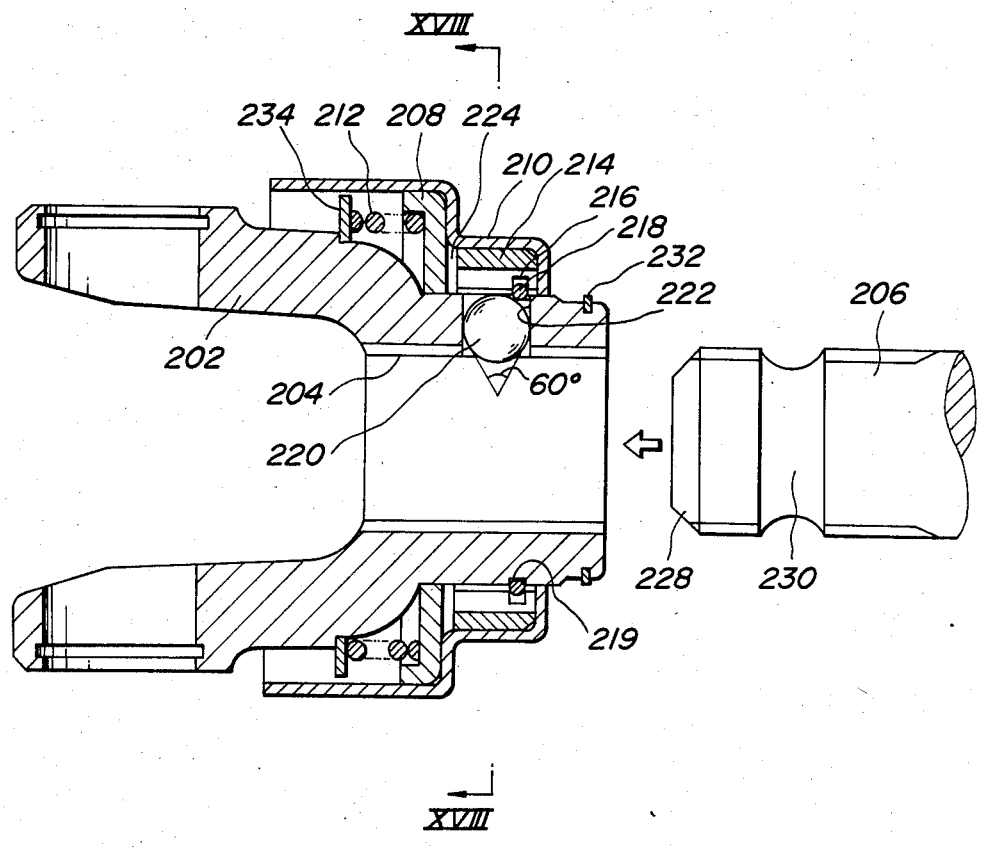
FIG. 16 is a sectional view of a coupling of a fifth embodiment of the invention, illustrating an outer cover which has been slid for inserting a shaft into a hub member.
Figure 17:
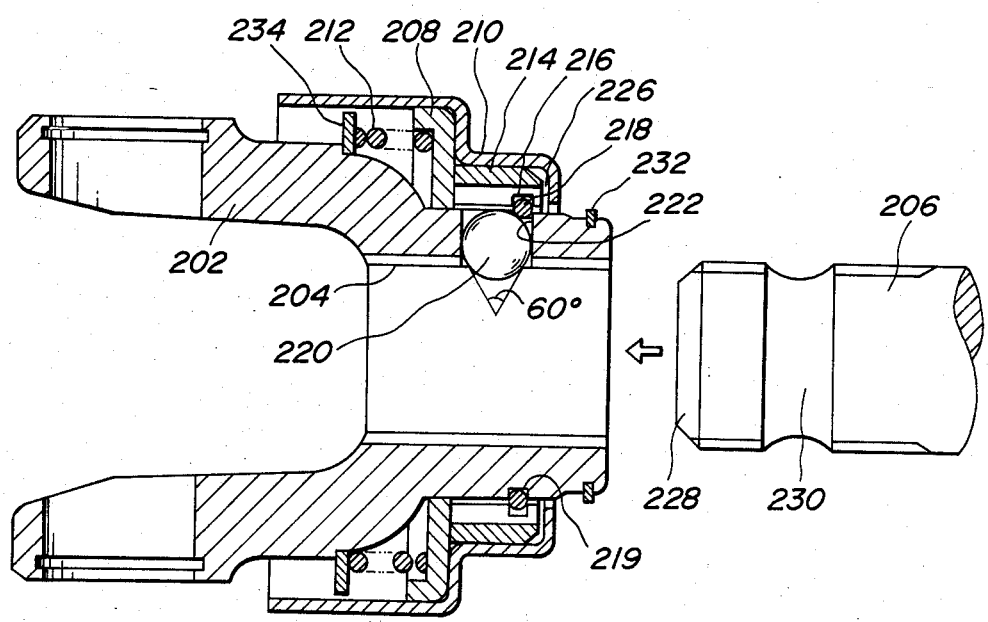
FIG. 17 is a sectional view of the coupling shown in FIG. 16 illustrating a condition where the slid outer cover is released.
Figure 18:
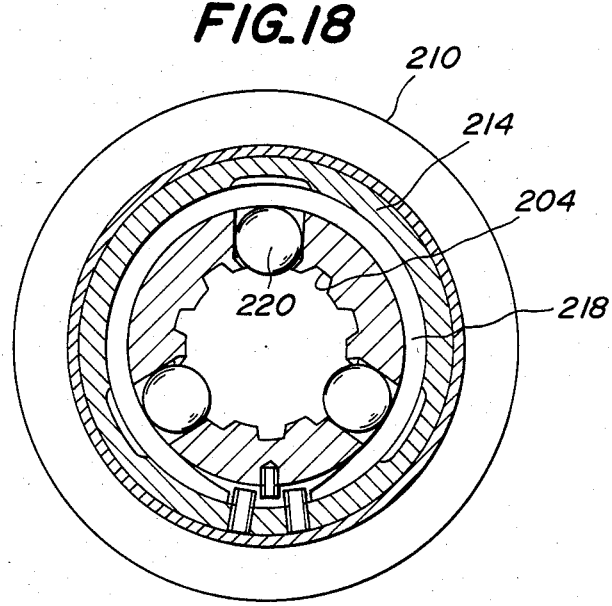
FIG. 18 is a sectional view of the coupling taken along a line XVIII—XVIII in FIG. 16.
Figure 23A:
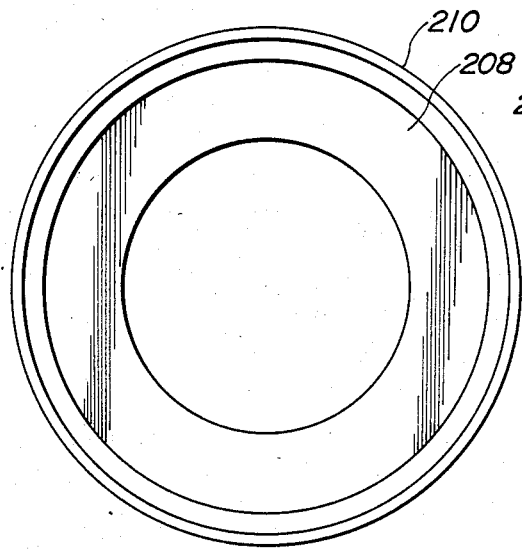
FIG. 23a is a front elevation of the outer cover and a setting ring used in FIG. 16.
Figure 23B:
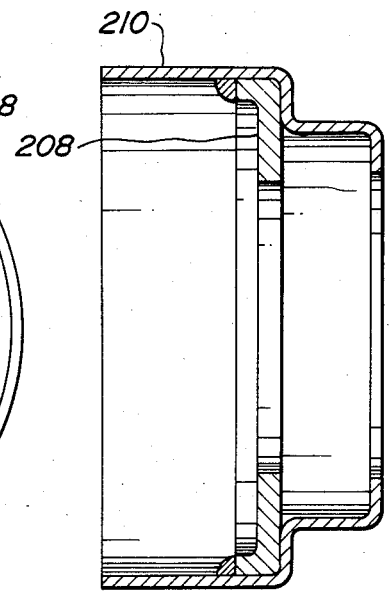
Figure 24:
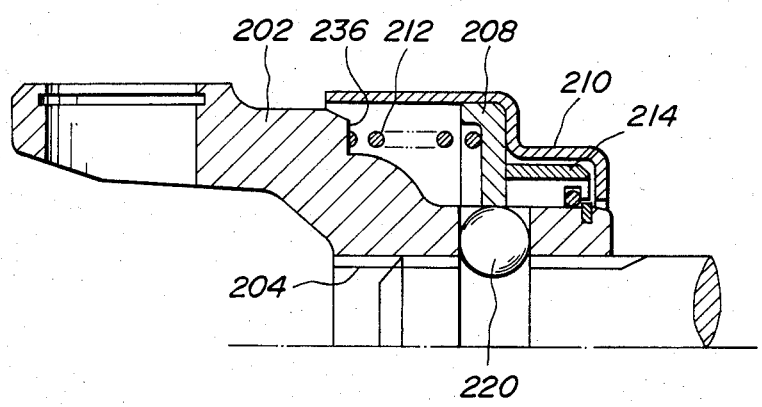
FIG. 24 is a partial sectional view of a coupling of a further embodiment of the invention.

FIGS. 16–23 illustrate a fifth embodiment of the invention. In this embodiment, a slide ring comprises a setting ring 208, an outer cover 210 fixed to the setting ring 208, and a setting cover 214. In order to insert a splined shaft 206 into a socket 204 of a yoke 202, the setting ring 208 and the outer cover 210 are moved to the left as viewed in FIG. 16 against a force of a compression coil spring 212 (FIG. 16). As the result of the movement of the outer cover 210, the setting cover 214 is urged to the left so as to be brought into the position shown in FIG. 16 together with a spring ring 218 accommodated in a spring ring receiving groove 216 formed in the setting cover 214. As the spring ring 218 normally tends to contract its diameter, the spring ring 218 snaps in a spring ring holding groove 219 formed along an edge of apertures accommodating detent balls 220. In this condition, when the outer cover is released, the compression coil spring 212 tends to return the setting ring 208 and the outer cover 210 the right as viewed in FIG. 16. However, as the spring ring 218 engages in the spring ring holding groove 219, the setting ring 208 and the outer cover 210 are only allowed to move slightly to the right by a distance corresponding to a clearance 224 between the setting ring 208 and the setting cover 214 plus a clearance between the spring ring 218 and a groove 216 receiving it therein. This condition is shown in FIG. 17. In this condition, the clearance 224 between the setting ring 208 and setting cover 214 has been eliminated, and instead thereof a clearance 226 newly appears between the outer cover 210 and the setting cover 214 at its right-hand end as viewed in FIG. 17. The condition shown in FIG. 17 is maintained without requiring the holding of the outer cover 210 by a hand of the operator. In this condition, the splined shaft 206 can be readily inserted into the socket 204 of the yoke 202.

A chamfered portion 16 of the splined shaft 206 inserted in the socket 204 of the yoke 202 urges detent balls 220 outwardly against the force of the spring ring 218. As the result, the spring ring 218 is forced by the detent balls 220 out of the spring ring holding groove 219 into a position shown in FIG. 19. Since the spring ring 218 preventing the setting ring 208 from moving the action of the coil spring 212 has become out of the spring ring holding groove 219, the setting ring 208 is forced to the right as viewed in FIG. 19. At this moment, however, the detent balls 220 have extended outwardly by the insertion of the splined shaft 206, so that the setting ring 208 abuts against the detent balls 220 to urge them inwardly. However, the setting ring 208 cannot move to the right because the inserted splined shaft 206 prevents the detent balls 220 from moving inwardly.

The splined shaft 6 is further inserted into the socket 204 of the yoke 202 from the position shown in FIG. 19. When a ball-setting groove 230 of the splined shaft 206 arrives at the detent balls 220, the detent balls 220 are permitted to move inwardly, so that the setting ring 208 rides on the detent balls 220 to force them into the ball-setting groove 230 of the splined shaft 206 as shown in FIG. 20. At this time, the setting cover 214 has been moved to the right by the movement of the setting ring 208. The spring ring 218 held in the setting cover 214 has been also moved together with the setting cover 214, so that the spring ring 218 abuts against a stopper ring 232 at an end of the hub of the yoke 202, with the result that the setting cover 214, the setting ring 208 and the outer cover 210 do not move further toward the right as viewed in FIG. 20. In this position, the setting ring 208 holds the detent balls 220 in the ball-setting groove 230 of the splined shaft 206 so as to prevent the splined shaft 206 from removing from the yoke 202. The setting ring 208 is now in a "ball holding position". At this time, moreover, the setting ring 208 in the ball holding position is held in this position by the stopper ring 232 abutting against the spring ring 218 in the setting cover 214 urged through the setting ring 208 by the coil spring 212. Accordingly, the stopper ring 232 constitutes "holding position holding means" for the setting ring 208.

Furthermore, the position of the setting ring 208 shown in FIG. 17 is a "ball non-holding position" where the setting ring 208 does not hold the detent balls 220. In this ball non-holding position, the setting ring 208 is urged by the compression coil spring 212 but is held by the spring ring 218 engaging in the spring ring holding groove 219. Therefore, the spring ring 218 and the spring ring holding groove 219 constitute "non-holding position holding means" for the setting ring 208.

In order to remove the spline shaft 206 from the yoke 205, the outer cover 210 in the position shown in FIG. 20 is moved to the left as viewed in this drawing against the force of the coil spring 212 until the outer cover 210 arrives at the position shown in FIG. 16. In this position, the setting ring 208 and the setting cover 214 have been moved to the left by the movement of the outer cover 210, and the spring ring 218 has snapped in the spring ring holding groove 219.

Under this condition, when the outer cover 210 is released, the outer cover 210 and the setting ring 208 are slightly returned to the right into the position shown in FIG. 17. This position is the "ball non-holding position" for the setting ring 208 which is held in this position by the spring ring 218 engaging in the spring ring holding groove 219.

From this condition, the splined shaft 206 is removed from the yoke 202 toward the right. As the result, the detent balls 220 are forced out of the ball-setting groove 230 of the splined shaft against the force of the spring ring 218 into the position shown in FIG. 19. Although the spring ring 218 has been out of the spring ring holding groove 219 by the action of the detent balls 220, the setting ring 208 has abutted against the outwardly moved detent balls 220, so that the setting ring 208 cannot move further toward the right. (This condition of the setting ring 208 is not shown in any attached drawings.) However, when the chamfered end 228 of the splined shaft 206 has moved to the right beyond the detent balls 220, the detent balls are forced inwardly by the action of the setting ring 208, so that the setting ring 208, the outer cover 210 and the setting cover 214 together with the spring ring 218 are moved by the coil spring 212 to the right into the position shown in FIG. 20. At that time, the splined shaft 206 has been completely removed from the yoke 202. Although FIG. 20 illustrates the conditon where the splined shaft 206 has been inserted, the positions of the setting ring 208, the outer cover 210 and the setting cover 214 shown in this drawing are quite the same those when the splined shaft 206 has been thus removed.

With this arrangement, if an external force is inadvertently applied to the outer cover 210 during rotation of the yoke 202, the outer cover 210 is rotatable relative to the yoke 202 so as to serve as a safety cover.

Apertures 222 formed in the hub of the yoke 202 for receiving the detent balls are provided at their inner ends with inner surfaces having an angle of 60° as shown in FIG. 17 to prevent the detent balls 220 from falling into the socket 204 of the yoke 202.

The detent balls are preferably steel balls. However, they may be made of a wear-resistant plastic material. The number of the detent balls may be two. However, three detent balls as in this embodiment are preferable for stability. The stopper ring 232 may be a commercially available snap ring or circlip.

The spring ring 218 is annular as shown in FIG. 21 and having a spring force normally contracting radially inwardly. The spring ring 218 may have any sectional configuration. In general, however, the circular cross-section is preferable in view of contacting the detent balls. In this case, if the circular cross-section of the spring ring 218 is uniform, displacements or deformation in the proximity of ends of the spring ring 218 becomes small. In order to obtain a uniform deformation of the spring ring 218, the ends of the spring ring 218 are preferably made thin to facilitate the deformation at the ends as shown in FIG. 21. Moreover, the spring ring 218 may be made of a steel such as a spring steel or a plastic material having an elasticity such as nylon.

The setting cover 14 is shown in detail in FIGS. 22a and 22b. FIG. 8 illustrates in detail the setting ring 208 and the outer cover 210 which are connected by welding in this embodiment.

In the above embodiment, a plate 234 is provided on the yoke 202. Instead of the plate 234, the yoke 202 may be formed with a circular flat surface 236 for supporting the compression coil spring 212.

FIG. 25 illustrates a sixth embodiment, wherein a setting ring 236 and an outer cover 238 are different from those in the fifth embodiment. The setting ring 236 is rectangular in cross-section so as to be simple in construction and is not fixed to the outer cover 238. The outer cover 238 may be formed in its inside with an annular ridge 240, thereby dispensing with the stopper ring 232.

The power transmitting coupling according to the invention has the following advantages.

1. When it is required to insert a shaft into a hub member, the shaft is freely inserted into the hub member only by sliding the slide member without requiring holding the slide member during the insertion, whereby the shaft is automatically held in a socket of the hub member.

2. When it is required to remove the shaft from the hub member, the shaft is freely removed from the hub member only by sliding the slide member without requiring holding the slide member during the removal of the shaft.

3. The coupling according to the invention is simple and compact in construction, of light weight and inexpensive.

4. The coupling according to the invention is durable in use resulting from the simple construction and superior in uniformity in quality.

5. The spring for urging the slide member can be housed in the slide member, so that the coupling can be effectively operated in dusty and muddy places.

6. Means for holding the slide member in the "ball holding position" and "ball non-holding position" can be commonly used to reduce the number of parts.

7. If an external force is inadvertently applied to the outer cover during rotation of the hubmember, the outer cover is rotatable relative to the hub member, thereby ensuring the safety of the coupling.

It is further understood by those skilled in the art that the foregoing description is that of preferred embodiments of the disclosed couplings and that various changes and modifications may be made in the invention without departing from the spirit and scope thereof.

What is claimed is:

1. A power transmitting coupling including a hub member and a shaft fitted axially and slidably but nonrotatably therein, and at least one detent ball accommodated in said hub member and partially extending into a ball setting groove of said shaft for preventing the shaft from removing from said hub member, said coupling comprising:
   (a) slide means slidable on said hub member into (1) a ball holding position where said detent ball is partially extended into said ball setting groove of said shaft to hold said shaft within said hub, and (2) a ball nonholding position where said detent ball does not hold said shaft within said hub, said slide means being formed in the form of a collar;
   (b) spring means for urging said slide means in one direction;
   (c) holding position holding means for holding said slide means at said ball holding position in cooperation with said spring means; and
   (d) nonholding position holding means for holding said slide means at said ball nonholding position in cooperation with said spring means and releasing said slide means when said detent ball moves out of said ball setting grove, said nonholding position holding means including a C-shaped spring ring having a spring force contracting radially inwardly accommodated in a spring ring receiving groove formed in an inside of said collar, and a spring ring holding groove formed in a circumference of said hub member, and said holding position holding means including said C-shaped spring ring and a stopper groove whose sidewall on a side of the detent ball is very slightly inclined toward a bottom of the stopper groove.

2. A power transmitting coupling as set forth in claim 1, wherein a stopper ring is provided on said hub member so as to abut against said slide means urged by said spring means to form said holding position holding means.

3. A power transmitting coupling as set forth in claim 1, wherein said spring ring has a circular cross-section and ends of the spring ring are made thinner than a remaining part of the spring ring so as to deform uniformly in its entirety.

4. A power transmitting coupling as set forth in claim 1, wherein said spring emans is a compression coil spring whose one end is seated on a circular flat shoulder formed on said hub member and the other end is seated in a circular recess formed in said slide means.

5. A power transmitting coupling as set forth in claim 1, wherein said spring means is a compression coil spring and is arranged in said slide means.

6. A power transmitting coupling including a hub member and a shaft fitted axially and slidably but nonrotatably therein, and at least one detent ball accommodated in said hub member and partially extending into a ball setting groove of said shaft for preventing the shaft from removing from the hub member, said coupling comprising:
   (a) slide means slidable on said hub member into (1) a ball holding position where said detent ball is partially extended into said ball setting groove of said shaft to hold said shaft within said hub, and (2) a ball nonholding position where said detent ball does not hold said shaft within said hub, said slide means including a setting ring slidable on said hub member to the ball holding position, a setting cover arranged on and slidable together with said setting ring and an outer cover causing said setting ring and said setting cover to slide together relative to said hub member;
   (b) spring means for urging said slide means in one direction;
   (c) holding position holding means for holding said slide means at said ball holding position in cooperation with said spring means; and
   (d) nonholding position holding means for holding said slide means at said ball nonholding position in cooperation with said spring means and releasing said slide means when said detent ball moves out of said ball setting grove, said nonholding position holding means including a C-shaped spring ring having a spring force contracting radially inwardly accommodated in a spring ring receiving groove formed in an inside of said setting cover, and a spring ring holding groove formed in a circumference of said hub member, and said holding position holding means including a stopper ring provided on said hub member so as to abut against said C-shaped spring ring urged by said spring means.

7. A power transmitting coupling as set forth in claim 6, wherein said setting ring and said outer cover are integrally fixed to each other.

8. A power transmitting coupling as set forth in claim 6, wherein said setting ring is made in the form of a ring having a rectangular cross-section and is not fixed to said outer cover.

9. A power transmitting coupling as set forth in claim 6, wherein said outer cover is provided with an annular ridge so as to engage a plate provided on said hub member when said slide means is at the ball holding position to form said holding position holding means.

* * * * *